United States Patent
Kim et al.

(10) Patent No.: US 9,160,007 B2
(45) Date of Patent: Oct. 13, 2015

(54) ELECTRODE FOR FUEL CELL, METHOD OF FABRICATING THE SAME, AND MEMBRANE-ELECTRODE ASSEMBLY FOR FUEL CELL AND FUEL CELL SYSTEM INCLUDING THE SAME

(75) Inventors: Jun-Young Kim, Yongin-si (KR); Myoung-Ki Min, Yongin-si (KR); Hee-Tak Kim, Yongin-si (KR)

(73) Assignee: SAMSUNG SDI CO., LTD., Yongin-si, Gyeonggi-Do (KR)

( * ) Notice: Subject to any disclaimer, the term of this patent is extended or adjusted under 35 U.S.C. 154(b) by 152 days.

(21) Appl. No.: 13/588,849

(22) Filed: Aug. 17, 2012

(65) Prior Publication Data

US 2014/0030618 A1    Jan. 30, 2014

(30) Foreign Application Priority Data

Apr. 10, 2012   (KR) ........................ 10-2012-0037346

(51) Int. Cl.
| | |
|---|---|
| *H01M 4/86* | (2006.01) |
| *H01M 4/88* | (2006.01) |
| *H01M 8/06* | (2006.01) |
| *H01M 8/10* | (2006.01) |

(52) U.S. Cl.
CPC .......... *H01M 4/8657* (2013.01); *H01M 4/8817* (2013.01); *H01M 8/0612* (2013.01); *H01M 2008/1095* (2013.01); *Y02E 60/50* (2013.01)

(58) Field of Classification Search
USPC .................. 429/480–481, 483, 523, 532, 534
See application file for complete search history.

(56) References Cited

U.S. PATENT DOCUMENTS

| | | | |
|---|---|---|---|
| 6,733,915 B2 * | 5/2004 | Barton et al. ................. | 429/481 |
| 2002/0090543 A1 * | 7/2002 | Okamoto ........................ | 429/44 |
| 2004/0209136 A1 * | 10/2004 | Ren et al. ....................... | 429/30 |
| 2005/0026012 A1 | 2/2005 | O'Hara | |
| 2005/0064275 A1 | 3/2005 | Mekala et al. | |
| 2005/0191532 A1 * | 9/2005 | Kim et al. ...................... | 429/19 |
| 2005/0221141 A1 * | 10/2005 | Hampden-Smith et al. ..... | 429/33 |
| 2005/0255373 A1 * | 11/2005 | Kimura et al. ................. | 429/44 |
| 2006/0029858 A1 | 2/2006 | Ji | |
| 2006/0210862 A1 * | 9/2006 | Zeng et al. ..................... | 429/38 |
| 2007/0218347 A1 * | 9/2007 | Takahashi et al. .............. | 429/44 |
| 2009/0081504 A1 * | 3/2009 | Sato ............................... | 429/25 |

FOREIGN PATENT DOCUMENTS

| | | | | |
|---|---|---|---|---|
| JP | 2006004879 A | * | 1/2006 | |
| JP | 2007-500424 A | | 1/2007 | |
| JP | 2007323939 A | * | 12/2007 | |
| JP | 2008-509521 A | | 3/2008 | |
| JP | 2009080968 A | * | 4/2009 | |
| KR | 10-2006-0090668 A | | 8/2006 | |

OTHER PUBLICATIONS

IPDL Machine Translation of the Detailed Description of JP 2009-080968A (Apr. 2009).*
Parker, et al. "Water capture by a desert beetle", *Nature* 414: 33-34 (Nov. 1, 2001).

* cited by examiner

*Primary Examiner* — Gregg Cantelmo
(74) *Attorney, Agent, or Firm* — Knobbe, Martens, Olson & Bear LLP

(57) ABSTRACT

Disclosed are an electrode for a fuel cell that includes an electrode substrate and a surface-treatment layer disposed on the electrode substrate and including a hydrophilic layer and a hydrophobic layer partially disposed on the hydrophilic layer. Also disclosed are a method of fabricating an electrode for a fuel cell, a membrane-electrode assembly, and a fuel cell system including the membrane-electrode assembly.

15 Claims, 5 Drawing Sheets

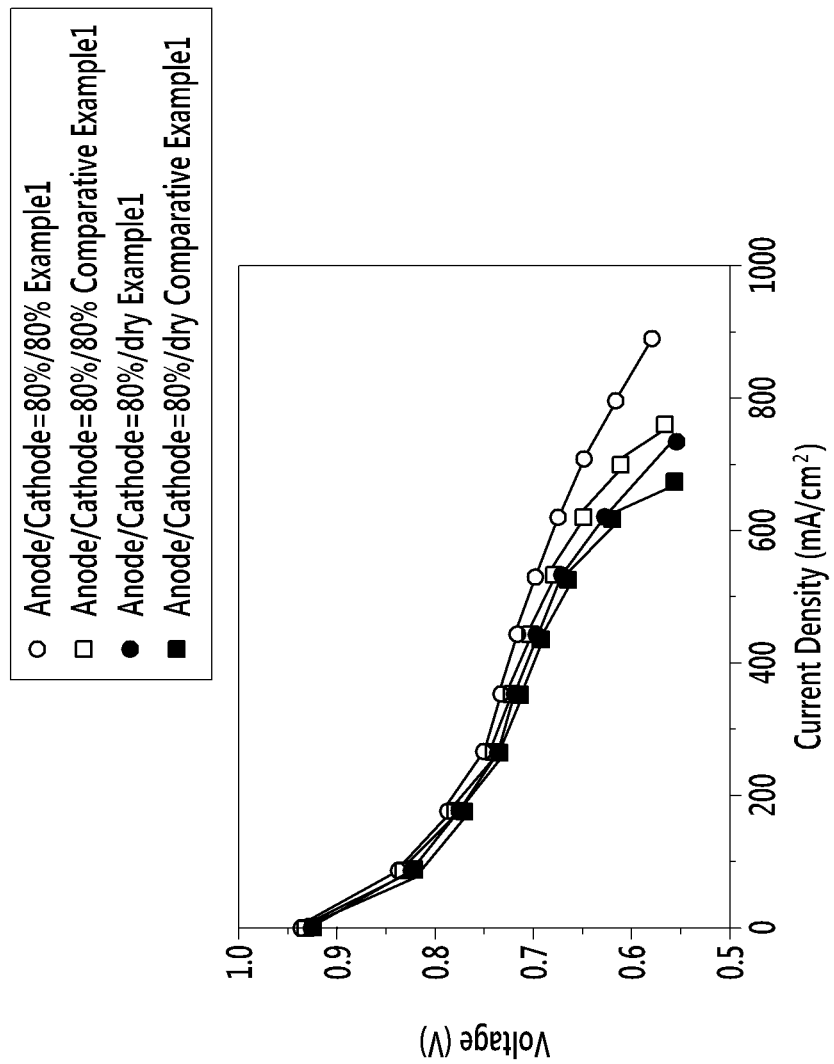

ELECTRODE FOR FUEL CELL, METHOD OF FABRICATING THE SAME, AND MEMBRANE-ELECTRODE ASSEMBLY FOR FUEL CELL AND FUEL CELL SYSTEM INCLUDING THE SAME

CROSS-REFERENCE TO RELATED APPLICATIONS

This application claims priority to and the benefit of Korean Patent Application No. 10-2012-0037346 filed in the Korean Intellectual Property Office on Apr. 10, 2012, the entire contents of which are incorporated herein by reference.

BACKGROUND

1. Field of the Disclosure

This disclosure relates to an electrode for a fuel cell, a method of fabricating the same, and a membrane-electrode assembly for a fuel cell and a fuel cell system including the same.

2. Description of the Related Technology

A fuel cell is a power generation system for producing electrical energy through an electrochemical redox reaction between an oxidant and hydrogen from a hydrocarbon-based material such as methanol, ethanol, or a natural gas. Such a fuel cell includes a stack composed of unit cells, and which produces various ranges of power. Since the fuel cell has between about four and about ten times higher energy density than a small lithium battery, it may be used as a small portable power source. Representative examples of fuel cells include polymer electrolyte membrane fuel cell ("PEMFC") and direct oxidation fuel cell ("DOFC"). A direct oxidation fuel cell configured to use methanol as a fuel is called a direct methanol fuel cell ("DMFC"). The PEMFC has an advantage of high energy density, but it also has problems including a need to carefully handle hydrogen gas and a requirement of accessory facilities, such as a fuel reforming processor for reforming methane, methanol, natural gas, and the like, to produce hydrogen as the fuel gas. The DOFC has lower energy density than that of the PEMFC, but it has advantages of easy handling of a fuel, being capable of operating at room temperature due to its low operation temperature, and no need for additional fuel reforming processors.

In the above-mentioned fuel cell systems, the stack that generates electricity generally includes several unit cells stacked adjacent to one another. Each unit cell is formed of a membrane-electrode assembly ("MEA") and a separator (also referred to as a bipolar plate). The MEA is composed of an anode (also referred to as a "fuel electrode" or an "oxidation electrode") and a cathode (also referred to as an "air electrode" or a "reduction electrode") separated by a polymer electrolyte membrane. At least one of the anode and the cathode includes an electrode substrate and a catalyst layer. Further, the electrode substrate may be configured to transport gas or remove moisture. However, flooding and drying phenomena may occur in a MEA during driving under humidifying and non-humidifying conditions, so the water management balance is broken and may, therefore, cause performance deterioration of the fuel cell.

SUMMARY OF CERTAIN INVENTIVE ASPECTS

In one aspect, a fuel cell electrode with excellent performance is provided. The fuel cell may be configured to prevent flooding and drying phenomena caused in a membrane-electrode assembly under humidifying and non-humidifying conditions. The fuel cell may be configured to provide effective water management.

In another aspect, a method of fabricating a fuel cell electrode is provided.

In another aspect, a membrane-electrode assembly including a fuel cell electrode is provided.

In another aspect, a fuel cell system including an electrode for a fuel cell is provided.

In another aspect, a fuel cell electrode is provided. The electrode for a fuel cell includes, for example, an electrode substrate, a surface-treatment layer disposed on the electrode substrate, and a catalyst layer disposed on the surface-treatment layer. The surface-treatment layer may include, for example a hydrophilic layer and a hydrophobic layer partially disposed on the hydrophilic layer, the hydrophobic layer having a larger thickness than the hydrophilic layer.

In some embodiments, the hydrophilic layer has a thickness of about 10 nm to about 30 μm. In some embodiments, the hydrophobic layer has a thickness of about 20 nm to about 60 μm. In some embodiments, the hydrophilic layer may include a compound having a hydrophilic group on the top from the surface of the electrode substrate. In some embodiments, the hydrophilic group may include a carboxylate group, a carboxyl group, an amino group, a hydroxy group, an aldehyde group, a sulfonic acid group, a nitrile group, a C1 to C20 alkoxy group, or a combination thereof. In some embodiments, the hydrophobic layer may include a compound having a hydrophobic group on the top from the surface of the electrode substrate. In some embodiments, the hydrophobic group may include a C1 to C10 alkyl group, a C1 to C10 fluoroalkyl group, a C1 to C10 alkylene group, a C1 to C10 fluoroalkylene group, a C1 to C10 monoalkoxysilane group, a monohalosilane group, a monoaminosilane group, a C1 to C10 trialkoxysilane group, a trihalosilane group, a triaminosilane group, a C1 to C10 trialkoxydisilane group, a trihalodisilane group, a triaminodisilane group, or a combination thereof.

In another aspect, a method of fabricating an electrode for a fuel cell is provided. The method includes, for example, depositing a hydrophilic layer on the surface of an electrode substrate, depositing a hydrophobic layer having a greater thickness than the hydrophilic layer on the hydrophilic layer, and patterning the hydrophobic layer according to a photolithography process, an anisotropic etching process, a layer-by-layer assembly process, or a mixed process thereof.

In another aspect, a membrane-electrode assembly for a fuel cell that includes an anode and a cathode facing each other is provided. A polymer electrolyte membrane may be interposed between the anode and cathode. In some embodiments, either or both of the anode and the cathode includes an electrode as described herein.

In another aspect, a fuel cell system is provided. The fuel cell system includes, for example, a fuel supplier configured for supplying a mixed fuel including a fuel and water, a reforming part configured for reforming the mixed fuel and generating a reformed gas including a hydrogen gas, a stack including an electrode and configured for generating electrical energy through an electrochemical reaction of the reformed gas and an oxidizing agent, and an oxidizing agent supplier configured for supplying the oxidizing agent to the reforming part and stack.

In some embodiments, during operation of the device a flooding and drying phenomena caused in a membrane-electrode assembly under humidifying and non-humidifying conditions may be prevented, water is effectively managed, and thus, the device has improved performance.

BRIEF DESCRIPTION OF THE DRAWINGS

The accompanying drawings, together with the specification, illustrate exemplary embodiments of the present disclosure, and, together with the description, serve to explain the principles of the present disclosure.

FIG. 5 is a graph showing performance of unit cells according to Example 1 and Comparative Example 1.

DETAILED DESCRIPTION OF CERTAIN INVENTIVE EMBODIMENTS

The embodiments will be described more fully hereinafter, in which exemplary embodiments are shown. This disclosure may, however, be embodied in many different forms and is not be construed as limited to the exemplary embodiments set forth herein. When a specific description is not otherwise provided, it will be understood that when an element such as a layer, film, region, or substrate is referred to as being "on" another element, it can be directly on the other element or intervening elements may also be present. When a specific description is not otherwise provided, the term hydrophilic in "hydrophilic layer", "hydrophilic group" and "hydrophilic part" also includes ultra hydrophilic; and the term hydrophobic in "hydrophobic layer", "hydrophobic group" and "hydrophobic part" also includes ultra hydrophobic. In this case, the ultra hydrophilic, the hydrophilic, the hydrophobic, and the ultra hydrophobic are classified by less than 5°, greater than or equal to 5° and less than 90°, greater than or equal to 90° and less than 150°, and greater than or equal to 150°, respectively depending upon the water contact angle ("WCA").

An electrode for a fuel cell according to one embodiment includes an electrode substrate and a surface-treatment layer disposed on the electrode substrate. The surface-treatment layer includes a hydrophilic layer and a hydrophobic layer at least partially disposed on the hydrophilic layer.

According to one embodiment, the electrode substrate may be surface-treated with the surface-treatment layer including the hydrophilic layer and the hydrophobic layer. In this case, the hydrophilic group present at the compound terminal end of the hydrophilic layer has the different height from the hydrophobic group present at the compound terminal end of the hydrophobic layer and alternatively arranged. In this case, the distance between the hydrophilic group and the hydrophobic may be relatively constant or may be completely irregular.

The electrode substrates may be formed from a material such as carbon paper, carbon cloth, carbon felt, or a metal cloth (a porous film composed of metal fiber or a metal film disposed on a surface of a cloth composed of polymer fibers). The electrode substrate, however, is not limited thereto and may be formed of any suitable material as determined by one of skill in the art.

The electrode substrate may include a fluorinated resin. The conductive substrate may be water-repellent treated with a fluorinated resin configured to prevent deterioration of reactant diffusion efficiency due to water generated during driving the fuel cell. The fluorinated resin may include polytetrafluoroethylene ("PTFE"), polyvinylidene fluoride, polyhexafluoropropylene, polyperfluoroalkylvinylether, polyperfluorosulfonylfluoridealkoxyvinyl ether, fluorinated ethylene propylene, polychlorotrifluoroethylene, or a copolymer thereof.

Figure 1:
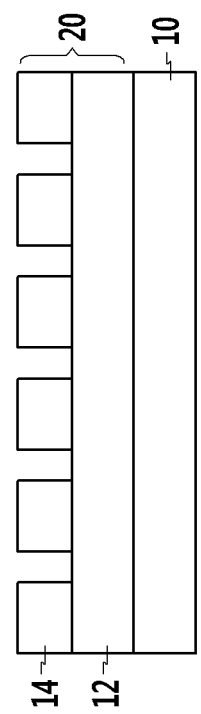
FIG. 1 is a cross-sectional view showing a surface-treated electrode substrate according to one embodiment.

The surface-treated structure of the electrode substrate may be described referring to FIG. 1. FIG. 1 shows only one example, but the structure of electrode according to one embodiment is not limited thereto. FIG. 1 is a cross-sectional view showing a surface-treated electrode substrate according to one embodiment. As shown in FIG. 1, a surface-treatment layer 20 is disposed on the electrode substrate 10. The surface-treatment layer 20 includes a hydrophilic layer 12 and a hydrophobic layer 14. The hydrophilic layer 12 is disposed on the electrode substrate 10, and the hydrophobic layer 14 is partially disposed on the hydrophilic layer 12.

The hydrophilic layer may contain moisture extracted from air and may also discharge water toward an outside surface of electrode substrate through the hydrophobic layer when the moisture amount increases.

The hydrophobic layer may be a thicker than the hydrophilic layer. In some embodiments, the hydrophilic layer may have a thickness of about 10 nm to about 30 μm, for example, about 100 nm to about 5 μm. In some embodiments, the hydrophobic layer may have a thickness of about 20 nm to about 60 μm, for example, about 200 nm to about 10 μm. In other words, the hydrophobic layer may be thicker than the hydrophilic layer within the each thickness range. When the hydrophobic layer and the hydrophilic layer have the thickness within the ranges described above, respectively, each layer is configured to have a surface characteristic such as being either hydrophobic or hydrophilic.

The hydrophilic layer and the hydrophobic layer may each include a bottom and top surface sequentially disposed from the surface of the electrode substrate. The hydrophilic layer may include a compound having a hydrophilic group at the top surface. In addition, the hydrophobic layer may include a compound having a hydrophobic group at the top surface. The compound having a hydrophilic group has a shorter chain length than the chain length of the compound having a hydrophobic group. The hydrophilic group may include a carboxylate group, a carboxyl group, an amino group, a hydroxy group, an aldehyde group, a sulfonic acid group, a nitrile group, a C1 to C20 alkoxy group, or a combination thereof.

The compound having a hydrophilic group may include at least one selected from a chitosan/polyacrylic acid-polyethyleneglycol copolymer which indicates a layer-by-layer assembly of chitosan and a copolymer of polyacrylic acid and polyethyleneglycol; chitosan/polyacrylic acid which indicates a layer-by-layer assembly of chitosan and polyacrylic acid; chitosan/carboxylmethylcellulose which indicates a layer-by-layer assembly of chitosan and carboxylmethyl cellulose; and chitosan/hyaluronic acid which indicates a layer-by-layer assembly of chitosan and hyaluronic acid.

The hydrophobic group may include a C1 to C10 alkyl group, a C1 to C10 fluoroalkyl group, a C1 to C10 alkylene group, a C1 to C10 fluoroalkylene group, a C1 to C10 monoalkoxysilane group, a monohalosilane group, a monoaminosilane group, a C1 to C10 trialkoxysilane group, trihalosilane group, a triaminosilane group, a C1 to C10 trialkoxydisilane group, a trihalodisilane group, a triaminodisilane group, a or combination thereof.

Examples of the compound having a hydrophobic group may include a carbon nanotube/ZnO composite, a carbon nanotube/ionomer composite, a fluorodecyl-treated carbon nanotube/ZnO composite, a fluorodecyl-treated carbon nanotube/ionomer composite, or a combination thereof. The ionomer may be any hydrogen ion conductive polymers generally used in the fuel cell, such as Nafion.

Figure 2:
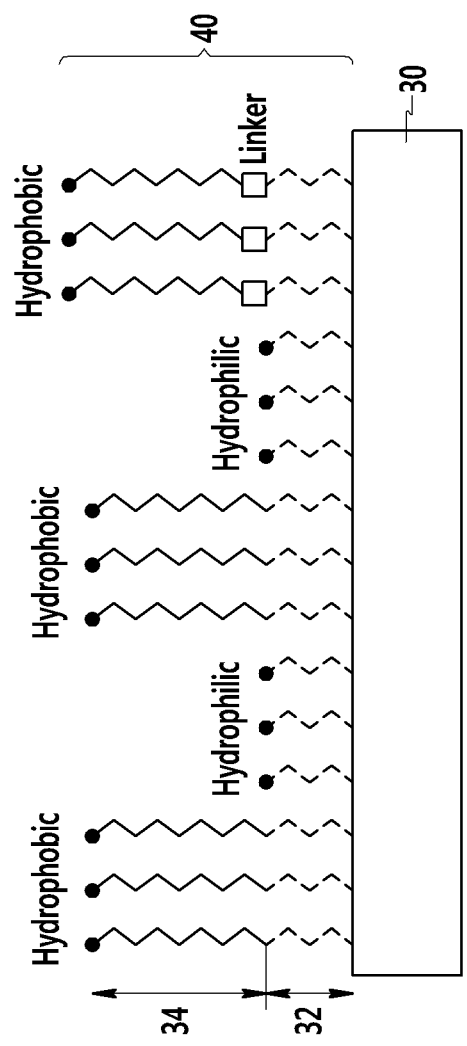
FIG. 2 is schematic view showing materials of a surface-treated electrode substrate according to the embodiment of FIG. 1.

One embodiment of a surface-treated structure of the electrode substrate is described with reference to FIG. 2. FIG. 2 is schematic view showing materials of a surface-treated electrode substrate. Referring to FIG. 2, a surface-treatment layer 40 is disposed on the electrode substrate 30, and the surface-treatment layer 40 includes a hydrophilic layer 32 and a hydrophobic layer 34. The hydrophilic layer 32 is disposed on the electrode substrate 30, and the hydrophobic layer 34 is partially disposed on the hydrophilic layer 32. The hydrophilic layer 32 may include a compound having a hydrophilic group at the top from the surface of the electrode substrate 30. The hydrophobic layer 34 may include a compound having a hydrophobic group at a top from the surface of the electrode substrate 30.

A space on the hydrophilic layer and between the hydrophobic layers, which is exposed to the external refers to a micro channel. Due to the surface-treatment layer structure and the hydrophilic group of the hydrophilic layer for the micro channel, during operation of the device moisture may be extracted from air and contained. Further, a water micro-droplet is generated when the moisture amount is increased. The size of the water micro-droplet increases until it fills the micro channel. The water micro-droplet increases to greater than or equal to a predetermined size by overcoming the capillary force and then may be transferred to the hydrophobic layer. Subsequently, the water micro droplet may be discharged toward the outside surface of the electrode substrate due to the surface characteristic of the hydrophobic layer.

When the electrode substrate is surface-treated according to the structure described herein, the flooding and drying phenomenon that may occur during operation of the membrane-electrode assembly under the humidifying and non-humidifying conditions may be prevented, and thus, provide an effective water management, which therefore provides improved fuel cell performance.

A method of manufacturing a surface-treated electrode substrate having a structure as described herein is as follows:

After depositing the hydrophilic layer on the surface of electrode substrate, a hydrophobic layer is deposited having a thicker thickness than the hydrophilic layer on the hydrophilic layer. Then the hydrophobic layer is patterned according to a photolithography process, an anisotropic etching process, a layer-by-layer assembly process, or a mixed process thereof to provide a surface-treated electrode substrate. For example, the patterning the hydrophobic layer may include positioning a patterned mask on the hydrophobic layer deposited on the hydrophilic layer; and irradiating plasma, electron beam, or UV to etch the hydrophobic layer. The patterning process is performed until the hydrophilic layer is partially exposed to the external.

The electrode for a fuel cell may further include a catalyst layer disposed on the surface-treated electrode substrate as described in above. The catalyst layer may include any catalyst that can act as a catalyst at a fuel cell reaction, specifically a metal catalyst, and more specifically a platinum-based catalyst. The platinum-based catalyst may include platinum, ruthenium, osmium, a platinum-ruthenium alloy, a platinum-osmium alloy, a platinum-palladium alloy, a platinum-M alloy (where M is transition element selected from Ga, Ti, V, Cr, Mn, Fe, Co, Ni, Cu, Zn, Sn, Mo, W, Rh, Ru, or a combination thereof), or a combination thereof.

An anode and a cathode may be formed of the same material. However, an anode catalyst may include a platinum-ruthenium alloy as an active metal in a direct oxidation fuel cell to prevent catalyst poisoning due to carbon monoxide ("CO") produced during the anode reaction. Specific examples of the platinum-based catalyst may include Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, or a combination thereof.

The metal catalyst may used as a metal catalyst itself. In some embodiments, the metal catalyst may be supported on a carrier. The carrier may include a carbon-based material such as graphite, denka black, ketjen black, acetylene black, a carbon nanotube, a carbon nano fiber, carbon nano wire, a carbon nano ball, activated carbon, and the like, or an inorganic material particulate such as alumina, silica, zirconia, titania, and the like. Generally, the carbon-based material is used.

The metal supported on a carrier may be formed of a commercially available metal formed on a carrier or may be prepared by forming a metal on a carrier. A method of supporting a metal on a carrier is well-known in this related field and a detailed description thereof is omitted.

The catalyst layer may include a binder resin to improve adherence of the catalyst layer and proton transfer properties.

The binder resin may be a proton conductive polymer resin having a cation exchange group selected from the group consisting of a sulfonic acid group, a carboxylic acid group, a phosphoric acid group, a phosphonic acid group, and derivatives thereof at its side chain. Examples of the polymer include at least one proton conductive polymer selected from a fluorine-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyether-etherketone-based polymer, and a polyphenylquinoxaline-based polymer, and more specifically at least one proton conductive polymer selected from poly(perfluorosulfonic acid), poly(perfluorocarboxylic acid), a copolymer of tetrafluoroethylene having a sulfonic acid group and fluorovinylether, sulfide polyetherketone, an aryl ketone, poly (2,2'-m-phenylene)-5,5'-bibenzimidazole, and poly(2,5-benzimidazole).

The hydrogen ("$H^+$") may be replaced with $Na^+$, $K^+$, $Li^+$, $Cs^+$, or tetrabutylammonium in a proton conductive group of the proton conductive polymer. When the hydrogen $H^+$ is substituted with $Na^+$ in an ion exchange group at the terminal end of the proton conductive group, NaOH is used. When the hydrogen $H^+$ is substituted with tetrabutylammonium, tributylammonium hydroxide is used. $K^+$, $Li^+$, or $Cs^+$ may also be substituted with using appropriate compounds. A method of substituting hydrogen $H^+$ is known in art, and therefore is not further described in detail.

The binder resins may be used singularly or in combination. They may be used along with non-conductive polymers to improve adherence with the polymer electrolyte membrane. The binder resins may be used in a controlled amount according to their purposes.

Examples of the non-conductive polymers include at least one selected from polytetrafluoroethylene ("PTFE"), a tetrafluoroethylene-hexafluoropropylene copolymer ("FEP"), tetrafluoroethylene-perfluoro alkylvinylether copolymer ("PFA"), an ethylene/tetrafluoroethylene ("ETFE"), an ethylenechlorotrifluoro-ethylene copolymer ("ECTFE"), polyvinylidenefluoride, a polyvinylidenefluoride-hexafluoropropylene copolymer ("PVdF-HFP"), dodecylbenzenesulfonic acid, and sorbitol.

The electrode may further include a microporous layer configured to increase reactant diffusion effects. The microporous layer generally includes conductive powders with a particular particle diameter, for example a carbon powder, carbon black, acetylene black, activated carbon, a carbon fiber, fullerene, carbon nanotube, carbon nano wire, a carbon nano-horn), carbon nano ring, or a combination thereof. The microporous layer may be formed by coating a composition including a conductive powder, a binder resin, and a solvent on the electrode substrate. The binder resin may include polytetrafluoroethylene, polyvinylidenefluoride, polyhexafluoropropylene, polyperfluoroalkylvinylether, polyperfluorosulfonylfluoride, alkoxyvinyl ether, polyvinylalcohol, celluloseacetate, a copolymer thereof, and the like. The solvent may include alcohols such as ethanol, isopropyl alcohol, n-propylalcohol, and butanol, water, dimethyl acetamide, dimethylsulfoxide, N-methylpyrrolidone, tetrahydrofuran, and the like. The coating method may include, but is not limited to, screen printing, spray coating, doctor blade methods, gravure coating, dip coating, silk screening, painting, and so on, depending on the viscosity of the composition.

According to another embodiment, a membrane-electrode assembly for a fuel cell including an electrode of the present disclosure is provided. The membrane-electrode assembly may include, for example, an anode and a cathode facing each other, and a polymer electrolyte membrane disposed between the anode and cathode. At least one of the anode and the cathode is the electrode disclosed herein. The polymer electrolyte membrane may be a solid polymer electrolyte having a thickness of about 10 μm to about 200 μm, and be configured to act as an ion exchanger for transferring protons produced at a catalyst layer of an anode to a catalyst layer of a cathode.

The polymer electrolyte membrane may be any polymer electrolyte membrane made of a polymer resin having proton conductivity that is used for a polymer electrolyte membrane of a fuel cell. The proton conductive polymer resin may be a polymer resin having a cation exchange group selected from the group consisting of a sulfonic acid group, a carboxylic acid group, a phosphoric acid group, a phosphonic acid group, and derivatives thereof, at its side chain.

Examples of the polymer resin include at least one selected from the group consisting of a fluorine-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyether-etherketone-based polymer, or a polyphenylquinoxaline-based polymer. In one embodiment, the proton conductive polymer is at least one selected from the group consisting of poly(perfluorosulfonic acid) (commercially available as NAFION™) poly(perfluorocarboxylic acid), a sulfonic acid group-containing copolymer of tetrafluoroethylene and fluorovinylether, defluorinated polyetherketone sulfide, an aryl ketone, poly(2,2'-(m-phenylene)-5,5'-bibenzimidazole, or poly(2,5-benzimidazole).

The hydrogen (H) in the proton conductive group of the proton conductive polymer may be substituted with Na, K, Li, Cs, or tetrabutylammonium. When the H in the ionic exchange group of the proton conductive polymer is substituted with Na or tetrabutylammonium, NaOH or tetrabutylammonium hydroxide may be used, respectively. When the H is substituted with K, Li, or Cs, suitable compounds for the substitutions may be used. Since such a substitution is known to this art, a detailed description thereof is omitted. The polymer electrolyte membrane substituted with Na, K, Li, Cs, or tetrabutylammonium may return to a proton-form ($H^+$-form) polymer electrolyte membrane during acid treatment process of a catalyst layer.

Figure 3:
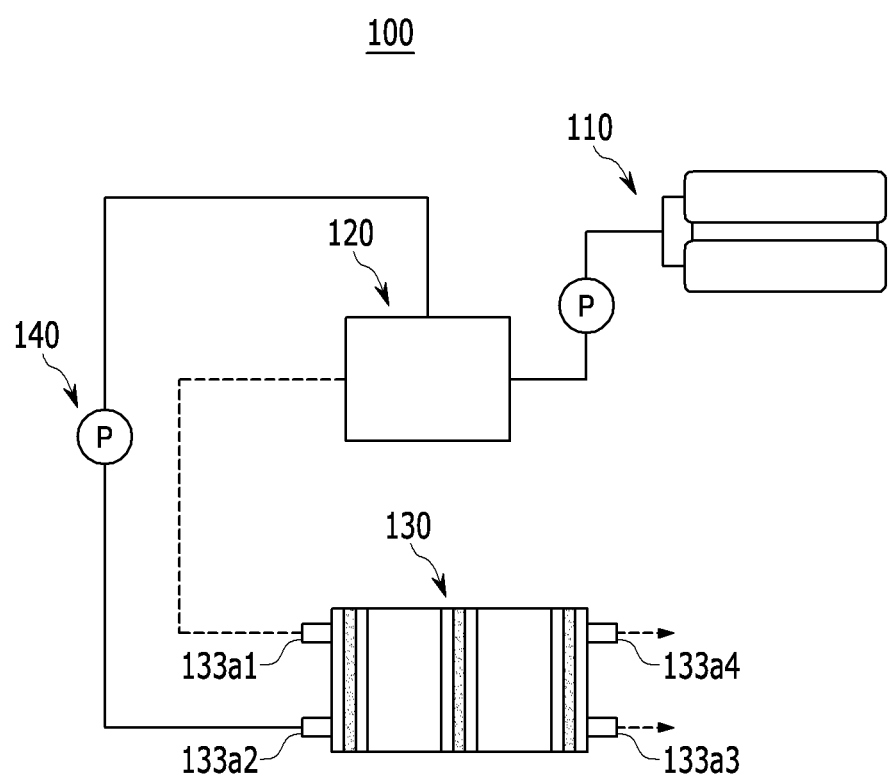
FIG. 3 is a schematic view showing a structure of a fuel cell system according to the embodiment of using the surface-treated electrode substrate of FIG. 1.
Figure 4:
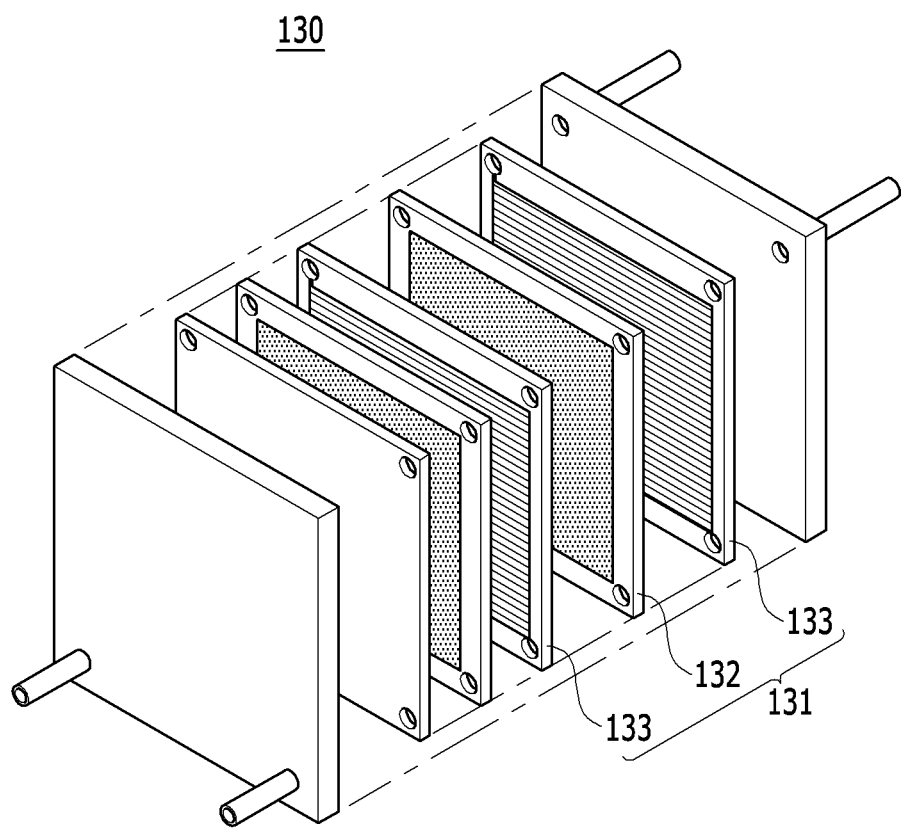
FIG. 4 is an exploded perspective view of a stack of a fuel cell system using the surface-treated electrode substrate of FIG. 1.

According to another embodiment, a fuel cell system including an electrode of the present disclosure is provided. The fuel cell system according to one embodiment is described referring to FIGS. 3 and 4. FIGS. 3 and 4 show one example of a fuel cell system, although the present disclosure is not limited thereto. FIG. 3 is a schematic view showing a structure of a fuel cell system, and FIG. 4 is an exploded perspective view describing a stack of a fuel cell system. Referring to FIGS. 3 and 4, a fuel cell system 100 includes a fuel supplier 110 configured for supplying a mixed fuel including a fuel and water, a reforming part 120 configured for reforming the mixed fuel and configured for generating a reformed gas including a hydrogen gas, a stack 130 including the electrode and configured for generating electrical energy through an electrochemical reaction of the reformed gas and an oxidizing agent, and an oxidizing agent supplier 140 configured for supplying the oxidizing agent to the reforming part 120 and stack 130.

The fuel cell system 100 includes a plurality of unit cells 131. In some embodiments, the unit cells 131 are configured to induce an oxidation-reduction reaction between the reformed gas supplied from the reforming part 120 and the oxidizing agent supplied from the oxidizing agent supplier 140 to generate electric energy during operation of the fuel cell system 100. Each unit cell 131 may thus function as a unit for generating electricity. The unit cell 131 includes a membrane-electrode assembly 132 configured to oxidize and reduce the reformed gas including hydrogen gases and oxygen in the oxidizing agent. The unit cell also includes separators 133 (also referred to as bipolar plates), which are configured to supply the hydrogen and oxidizing agent to the membrane-electrode assembly 132. The separators 133 are arranged on opposite sides of the membrane-electrode assembly 132. At this time, separators that are respectively located at the most exterior sides of the stack are referred to as, particularly, end plates 133*a*.

Moreover, the end plate 133*a* of the separators includes a first supply tube 133*a*1 having a pipe shape configured for injecting the reformed gas supplied from the reforming part 120, and a second supply tube 133*a*2 having a pipe shape configured for injecting the oxidizing agent. The other end plate 133*a* includes a first discharge tube 133*a*3 configured for discharging the remaining reformed gas that does not finally react in the plurality of unit cells 131, to the outside, and a second discharge tube 133*a*4 configured for discharging the remaining oxidizing agent that does not react finally in the plurality of unit cells 131, to outside.

Hereinafter, the embodiments are illustrated in more detail with reference to examples. However, the following are exemplary embodiments and are not limiting. A person having ordinary skill in the art informed by the present disclosure will be able to understand parts of the disclosure that are not described.

Example 1

Fabrication of Fuel Cell

A porous carbon paper having a porosity of greater than or equal to 80% was immersed into a liquid of a polytetrafluoroethylene ("PTFE") hydrophobic polymer in isopropanolto obtain the porous carbon paper with 5 wt % of PTFE, and it was fired at about 350° C. to provide an electrode substrate.

A hydrophilic layer including chitosan/polyacrylic acid-polyethyleneglycol copolymer which indicates a layer-by-layer of chitosan and a copolymer of polyacrylic acid and polyethyleneglylcol, was deposited on the surface of the obtained electrode substrate, and then a hydrophobic layer including a carbon nanotube/ZnO composite treated with fluorodecyl was deposited on the hydrophilic layer. Then according to a photolithography process, a patterned mask was disposed on the hydrophobic layer and irradiated with plasma or UV to etch the hydrophobic layer as the structure shown in FIG. 1. Thereby, the electrode substrate was treated on the surface. The obtained hydrophilic layer had a thickness of about and was present with hydroxyl group and carboxyl group. The hydrophobic layer had a thickness of about 2 μm and was present with trifluoromethyl group.

The catalyst composition for a cathode was prepared by adding 88 wt % of a catalyst of PtCo/C (Pt 48.6 wt %, Co 5.2 wt %, carbon:balance) into a mixed solvent (weight ratio of 50:50) of water and dipropylene glycol. As a solvent, an ionomer of 5 wt % Nafion® (manufactured by Dupont) was used, and the ionomer was included in 40 wt % based on the total amount of ionomer and catalyst.

The catalyst composition for anode was prepared in accordance with the same procedure as in the catalyst composition for cathode, except that the catalyst was 88 wt % of PtRu/C (Pt: 29.9 wt %, Ru 23.2 wt %, carbon:balance).

The prepared catalyst compositions were prepared for a cathode and an anode, respectively, and the catalyst composition for cathode and the catalyst composition for anode were used on both surfaces of the commercially available hydrocarbon-based polymer electrolyte membrane (poly(ether sulfone) based polymer electrolyte membrane, JST135 available from JSR Coporation), respectively to provide a CCM (catalyst coated membrane) in which the catalyst layer is bound with the polymer electrolyte membrane.

The surface-treated electrode substrates were disposed on the both surfaces of the CCM in which the prepared cathode catalyst layer and anode catalyst layer were bound to the polymer electrolyte membrane and inserted between gasket and inserted between two separate plates formed with a gas flow channel having a predetermined shape and a cooling channel to provide a unit cell. At this time, the loading amount of the cathode catalyst was 0.25 mg/cm$^2$, and the loading amount of the anode catalyst was 0.30 mg/cm$^2$. Furthermore, the active areas for the cathode and the anode were 25 cm$^2$, respectively.

Comparative Example 1

A unit cell was manufactured in accordance with the same procedure as in Example 1, except that electrode substrates without surface treatment were disposed on both surface of CCM in which the cathode catalyst layer and the anode catalyst layer were bound to the polymer electrolyte membrane according to Example 1.

Experimental Example

Evaluation of Fuel Cell Performance

The unit cell obtained from Example 1 and Comparative Example 1 was driven using fuel of air/H$_2$ at 60° C. to evaluate battery characteristics, and the results are shown in FIG. 5. When the relative humidity was anode/cathode=80%/dry and anode/cathode=80%/80%, the results for each case are shown. The fuel stoichiometric ratios of cathode and anode were 2.5 and 1.2, respectively.

FIG. 5 is a graph showing performance of unit cells according to Example 1 and Comparative Example 1. Referring to FIG. 5, when the cell was driven under the relative humidity condition of anode/cathode=80%/80%, Example 1 had higher current density than Comparative Example 1 at the same voltage, so it is understood that had better battery performance. In addition, when the cell was driven under the relative humidity condition of anode/cathode=80%/dry, it is also confirmed that Example 1 had also better battery performance than Comparative Example 1.

While this disclosure has been described in connection with what is presently considered to be practical exemplary embodiments, it will be appreciated by those skilled in the art that various modifications and changes may be made without departing from the scope of the present disclosure. It will also be appreciated by those of skill in the art that parts mixed with one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Thus, while the present disclosure has described certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electrode for a fuel cell, comprising:
    an electrode substrate;
    a surface-treatment layer disposed on the electrode substrate, the surface-treatment layer including a hydrophilic layer and a hydrophobic layer partially disposed on the hydrophilic layer, and
    a catalyst layer disposed on the surface-treatment layer,
    wherein the hydrophobic layer has greater thickness than the hydrophilic layer,
    wherein the hydrophobic layer is patterned with a plurality of micro channels positioned and shaped to discharge micro droplets of water,
    wherein the hydrophilic layer is disposed on a surface of the electrode substrate,
    wherein a first side of the hydrophobic layer directly contacts the hydrophilic layer, and
    wherein a second side of the hydrophobic layer includes a compound having a hydrophobic group.

2. The electrode of claim 1, wherein the hydrophilic layer has a thickness of about 10 nm to about 30 μm.

3. The electrode for a fuel cell of claim 1, wherein the hydrophobic layer has a thickness of about 20 nm to about 60 μm.

4. The electrode of claim 1, wherein the hydrophilic layer comprises a compound having a hydrophilic group formed on top of the surface of the electrode substrate.

5. The electrode of claim 4, wherein the hydrophilic group comprises a carboxylate group, a carboxyl group, an amino group, a hydroxy group, an aldehyde group, a sulfonic acid group, a nitrile group, a C1 to C20 alkoxy group, or a combination thereof.

6. The electrode of claim 1, wherein the hydrophobic group is selected from the group consisting of a C1 to C10 alkyl group, a C1 to C10 fluoroalkyl group, a C1 to C10 alkylene group, a C1 to C10 fluoroalkylene group, a C1 to C10 monoalkoxysilane group, a monohalosilane group, a monoaminosilane group, a C1 to C10 trialkoxysilane group, a trihalosilane group, a triaminosilane group, a C1 to C10 trialkoxydisilane group, a trihalodisilane group, a triaminodisilane group, and a combination thereof.

7. A method of manufacturing an electrode for a fuel cell, comprising:
   depositing a hydrophilic layer on a surface of an electrode substrate;
   depositing a hydrophobic layer having a thicker thickness than the hydrophilic layer on the hydrophilic layer; and
   patterning the hydrophobic layer according to a photolithography process, an anisotropic etching process, a layer-by-layer assembly process, or a mixed process thereof.

8. The method of claim 7, wherein the hydrophilic layer has a thickness of about 10 nm to about 30 μm.

9. The method of claim 7, wherein the hydrophobic layer has a thickness of about 20 nm to about 60 μm.

10. The method of claim 7, wherein the hydrophilic layer comprises a compound having a hydrophilic group on the top from the surface of the electrode substrate.

11. The method of claim 10, wherein the hydrophilic group comprises a carboxylate group, a carboxyl group, an amino group, a hydroxy group, an aldehyde group, a sulfonic acid group, a nitrile group, a C1 to C20 alkoxy group, or a combination thereof.

12. The method of claim 7, wherein the hydrophobic layer comprises a compound having a hydrophobic group on the top from the surface of the electrode substrate.

13. The method of claim 12, wherein the hydrophobic group is selected from the group consisting of a C1 to C10 alkyl group, a C1 to C10 fluoroalkyl group, a C1 to C10 alkylene group, a C1 to C10 fluoroalkylene group, a C1 to C10 monoalkoxysilane group, a monohalosilane group, a monoaminosilane group, a C1 to C10 trialkoxysilane group, a trihalosilane group, a triaminosilane group, a C1 to C10 trialkoxydisilane group, a trihalodisilane group, a triaminodisilane group, and a combination thereof.

14. A membrane-electrode assembly for a fuel cell, comprising:
   an anode and a cathode facing each other; and
   a polymer electrolyte membrane interposed between the anode and cathode,
   wherein at least one of the anode and the cathode comprises the electrode of claim 1.

15. A fuel cell system, comprising:
   a fuel supplier configured for supplying a mixed fuel including a fuel and water;
   a reforming part in fluid communication with the fuel supplier, the reforming part configured for reforming the mixed fuel and generating a reformed gas including a hydrogen gas;
   a stack in fluid communication with the reforming part, the stack including the electrode of claim 1, and the stack configure for generating electrical energy through an electrochemical reaction of the reformed gas and an oxidizing agent; and
   an oxidizing agent supplier in fluid communication with the stack, the oxidizing agent supplier configured for supplying the oxidizing agent to the reforming part and to the stack.

* * * * *